United States Patent
Alves et al.

(10) Patent No.: US 9,671,268 B2
(45) Date of Patent: Jun. 6, 2017

(54) DETECTION OF A CHANGE IN THE CROSS-SECTIONAL AREA OF A FLUID TUBE IN A VIBRATING METER BY DETERMINING A LATERAL MODE STIFFNESS

(71) Applicant: Micro Motion, Inc., Boulder, CO (US)

(72) Inventors: Goldino Alves, Superior, CO (US); Mark James Bell, Longmont, CO (US)

(73) Assignee: Micro Motion, Inc., Boulder, CO (US)

( * ) Notice: Subject to any disclaimer, the term of this patent is extended or adjusted under 35 U.S.C. 154(b) by 85 days.

(21) Appl. No.: 14/440,531

(22) PCT Filed: Nov. 29, 2012

(86) PCT No.: PCT/US2012/067067
§ 371 (c)(1),
(2) Date: May 4, 2015

(87) PCT Pub. No.: WO2014/084835
PCT Pub. Date: Jun. 5, 2014

(65) Prior Publication Data
US 2015/0276451 A1    Oct. 1, 2015

(51) Int. Cl.
*G01F 1/84* (2006.01)
*G01F 25/00* (2006.01)

(52) U.S. Cl.
CPC .......... *G01F 1/8477* (2013.01); *G01F 1/8436* (2013.01); *G01F 25/0007* (2013.01)

(58) Field of Classification Search
None
See application file for complete search history.

(56) References Cited

U.S. PATENT DOCUMENTS

| | | | |
|---|---|---|---|
| 5,731,527 A * | 3/1998 | Van Cleve | G01F 1/8477 73/861.355 |
| 6,092,409 A | 7/2000 | Patten et al. | |
| 6,272,438 B1 | 8/2001 | Cunningham et al. | |
| 7,716,995 B2 | 5/2010 | Patten et al. | |
| 7,774,150 B2 | 8/2010 | Stack | |
| 7,865,318 B2 | 1/2011 | Rensing et al. | |
| 8,280,651 B2 | 10/2012 | Rensing et al. | |
| 2008/0141789 A1 | 6/2008 | Kassubek et al. | |
| 2011/0247433 A1* | 10/2011 | Werbach | G01F 1/8418 73/861.357 |

FOREIGN PATENT DOCUMENTS

| | | |
|---|---|---|
| DE | 4327052 A1 | 2/1995 |
| JP | HEI04-191620 | 9/1992 |

* cited by examiner

*Primary Examiner* — Harshad R Patel
(74) *Attorney, Agent, or Firm* — The Ollila Law Group LLC

(57) ABSTRACT

A method for determining a lateral mode stiffness of one or more fluid tubes (103A, 103B) in a vibrating meter (5) is provided. The method comprises a step of vibrating at least one of the one or more fluid tubes (103A, 103B) in a drive mode vibration. Drive mode sensor signals (310) are received based on a vibrational response to the drive mode vibration. At least one of the one or more fluid tubes (103A, 103B) is vibrated in a lateral mode vibration, wherein the lateral mode is approximately perpendicular to the drive mode. Lateral mode sensor signals (317) are received based on a vibrational response to the lateral mode vibrations. The method further comprises determining a lateral mode stiffness (318) based on the lateral mode sensor signals (317).

19 Claims, 5 Drawing Sheets

DETECTION OF A CHANGE IN THE CROSS-SECTIONAL AREA OF A FLUID TUBE IN A VIBRATING METER BY DETERMINING A LATERAL MODE STIFFNESS

TECHNICAL FIELD

The embodiments described below relate to, vibrating meters, and more particularly, to improved detection of a change in the cross-sectional area of a fluid tube in vibrating meters.

BACKGROUND OF THE INVENTION

It is known to use vibrating meters to measure mass flow and other information of materials flowing through a pipeline. One particular type of vibrating meter is a vibrating Coriolis flow meter as disclosed in U.S. Pat. No. 4,491,025 issued to J. E. Smith, et al. of Jan. 1, 1985 and Re. 31,450 to J. E. Smith of Feb. 11, 1982. These vibrating meters have one or more fluid tubes. Each fluid tube configuration in a Coriolis mass flow meter has a set of natural vibration modes, which may be of a simple bending, torsional, radial, lateral, or coupled type. Each fluid tube is driven to oscillate at resonance in one of these natural modes. The vibration modes are generally affected by the combined mass, stiffness, and damping characteristics of the containing fluid tube and the material contained therein. Therefore, the mass, stiffness, and damping are typically determined during an initial calibration of the vibrating meter using well-known techniques. Material flows into the flow meter from a connected pipeline on the inlet side of the vibrating meter. The material is then directed through the fluid tube or fluid tubes and exits the flow meter to a pipeline connected on the outlet side.

A driver applies a force to the one or more fluid tubes. The force causes the one or more fluid tubes to oscillate. When there is no material flowing through the flow meter, all points along a fluid tube oscillate with an identical phase. As a material begins to flow through the fluid tubes, Coriolis accelerations cause each point along the fluid tubes to have a different phase with respect to other points along the fluid tubes. The phase on the inlet side of the fluid tube lags the driver, while the phase on the outlet side leads the driver. Sensors are placed at two different points on the fluid tube to produce sinusoidal signals representative of the motion of the fluid tube at the two points. A phase difference of the two signals received from the sensors is calculated in units of time.

The time difference between the two sensor signals is proportional to the mass flow rate of the material flowing through the fluid tube or fluid tubes. The mass flow rate of the material is determined by multiplying the time difference by a flow calibration factor. The flow calibration factor is dependent upon material properties, tube geometry, and cross sectional properties of the fluid tube. One of the major characteristics of the fluid tube that affects the flow calibration factor is the fluid tube's stiffness. Prior to installation of the flow meter into a pipeline, the flow calibration factor is determined by a calibration process. In the calibration process, a fluid is passed through the fluid tube at a given flow rate and the proportion between the time difference and the flow rate is calculated. The fluid tube's stiffness and damping characteristics are also determined during the calibration process as is generally known in the art.

One advantage of a Coriolis flow meter is that the accuracy of the measured mass flow rate is not affected by wear of moving components in the flow meter, for example no sliding of gears, etc. The flow rate is determined by multiplying the time difference between two points on the fluid tube and the flow calibration factor. The only input is the sinusoidal signals from the sensors indicating the oscillation of two points on the fluid tube. The time difference is calculated from the sinusoidal signals. There are no moving components in the vibrating fluid tube. The flow calibration factor is proportional to the material and cross sectional properties of the fluid tube. Therefore, the measurement of the phase difference and the flow calibration factor are not affected by wear of moving components in the flow meter.

However, it is a problem that the cross sectional properties of a fluid tube can change during use of vibrating meters. The changes in the material and cross sectional properties of the fluid tube can be caused by erosion, corrosion, and coating of the fluid tube by material flowing through the fluid tube.

Although prior art attempts have been made to provide a method for detecting a change in the cross-sectional areas of the fluid tubes in situ, these attempts are relatively limited. For example, U.S. Pat. No. 6,092,409, assigned on its face to the present applicants, discloses a system for detecting changes in the cross-sectional areas of the fluid tubes based on a change in the period of oscillation of the fluid tubes. A problem with this approach is that the method requires a known density to be flowing within the fluid tubes during the measurement. Without a known fluid flowing through the fluid tubes, the change in the period of oscillation may be due to a change in the cross-sectional areas of the fluid tubes, or may be due to a change in the fluid density. Therefore, this approach is not very useful in the field when the fluid flowing through the vibrating meter may have an unknown or a changing density.

There are also numerous prior art examples that explain how to determine a fluid tube stiffness based on a vibrational response of the fluid tube. As mentioned above, the fluid tube stiffness is generally determined during an initial calibration and is required to accurately determine a flow calibration factor of the meter. In addition to the initial calibration methods that are well known in the art and widely utilized in the vibrating meter industry, other prior art examples attempt to determine the fluid tube stiffness in situ using the existing driver and pick-off arrangement. For example, U.S. Pat. No. 6,678,624, assigned on its face to the present applicants, discloses a method that determines a modal dynamic stiffness matrix and subsequently determines the fluid tube stiffness. U.S. Pat. No. 7,716,995, assigned on its face to the present applicants, discloses another prior art approach that utilizes two or more vibrational responses and solves a single degree of freedom differential equation to determine the fluid tube's stiffness, damping, and mass characteristics, among other characteristics of the vibrating meter. As discussed in the '995 patent, in the most basic explanation, vibration of the Coriolis meter can be characterized using a simple spring equation:

$$2\pi f = \frac{2\pi}{\tau} = \sqrt{\frac{k}{m}} \tag{1}$$

Where:
f is the frequency of oscillation;
m is the mass of the assembly;

τ is the period of oscillation; and
k is the stiffness of the assembly.

Equation (1) can be rearranged to solve for the stiffness, k and the mass of the assembly can be easily measured using existing driver and pick-off assemblies.

Another prior art attempt at detecting changes in the cross-sectional areas of the fluid tubes is disclosed by U.S. Pat. No. 7,865,318, which is assigned on its face to the present applicants and is hereby incorporated by reference for all that it teaches. The '318 patent measures the stiffness of the fluid tubes based on a resonant drive frequency. The '318 patent explains that the vibrational response of a flow meter can be represented by an open loop, second order drive model, comprising:

$$M\ddot{x}+C\dot{x}+Kx=f \quad (2)$$

Where:
f is the force applied to the system;
x is the physical displacement of the fluid tube;
$\dot{x}$ is the velocity of the fluid tube;
$\ddot{x}$ is the acceleration of the fluid tube;
M is the mass of the system;
C is the damping characteristic; and
K is the stiffness characteristic of the system.

The '318 patent performs a number of substitutions and eventually arrives at equation (3) (equation 9 in the '318 patent), which is outlined as follows:

$$K = \frac{I*BL_{PO}*BL_{DR}*\omega_o}{2\zeta V} \quad (3)$$

Where:
ζ is the damping characteristic;
V is the drive voltage;
$BL_{PO}$ is the pick-off sensitivity factor;
$BL_{DR}$ is the driver sensitivity factor; and
I is the drive current.

The pick-off sensitivity factor and the driver sensitivity factor are generally known or measured for each pick-off sensor and driver. The damping characteristic is typically determined by allowing the vibrational response of the flow meter to decay down to a vibrational target while measuring the decay. Therefore, as explained in the '318 patent, the stiffness parameter (K) can be determined by measuring/quantifying the damping characteristics (ζ) the drive voltage (V); and the drive current (I). Although the approach proposed by the '318 patent can provide satisfactory results in certain situations, such as when changes in the drive mode stiffness occur, testing has shown that changes in the cross-sectional areas of curved fluid tubes, especially due to corrosion or erosion typically occurs in the outer radius of the tube bends, slightly downstream from the tube bends, or at the tube/manifold weld joints. While M, C, K, and ζ described above are mode dependent, the current methods measure the drive mode resonant frequency, $\omega_o$ and M, C, K, and ζ, in the drive mode. The drive mode stiffness (K) is altered when the wall thickness of the fluid tubes is altered. However, because erosion generally results in changes in the bends, changes in these areas often have very little impact on the generally measured bend mode, which are vibrated in typical vibrating meters at the drive mode resonant frequency, $\omega_o$, discussed in the '318 patent, for example. In order to detect changes in the bends, stress/strain needs to be produced in the bends, which does not generally occur when driving the fluid tubes in the drive mode. Therefore, prior art meters cannot typically detect a change in the cross-sectional areas of the fluid tubes using the current driver and pick-off architecture.

It should be appreciated that determining the fluid tube's stiffness and damping characteristics is required for practically all vibrating meters. Consequently, although specific equations are provided above, they should in no way limit the scope of the embodiments described below. Those skilled in the art will readily recognize alternative equations and methods for determining fluid tube stiffness based on a measured vibrational response.

Due to the inadequate stiffness determinations currently available, there is a need in the art for a system that detects a possible change in the material and/or cross sectional properties of a fluid tube indicating the measurements provided by the vibrating meter may be inaccurate. The embodiments described below overcome these and other problems and an advance in the art is achieved. The embodiments described below provide a vibrating meter that can be vibrated in a lateral mode in addition to the typical drive mode (bend). Because the changes in cross-sectional area generally occur at the outer radius of the tube bends, the change in cross-sectional area will affect the lateral mode stiffness of the fluid tubes to a much greater extent than the drive mode stiffness. In other words, a change in the lateral mode stiffness will not have a significant effect on the drive mode vibrational frequency, but will often change the lateral mode vibrational resonant frequency.

SUMMARY OF THE INVENTION

A method for determining a lateral mode stiffness of one or more fluid tubes in a vibrating meter is provided according to an embodiment. According to an embodiment, the method comprises steps of vibrating at least one of the one or more fluid tubes in a drive mode vibration and receiving drive mode sensor signals based on a vibrational response to the drive mode vibration. The method further comprises steps of vibrating at least one of the one or more fluid tubes in a lateral mode vibration, wherein the lateral mode is approximately perpendicular to the drive mode and receiving lateral mode sensor signals based on a vibrational response to the lateral mode vibrations. According to an embodiment, the method further comprises a step of determining a lateral mode stiffness based on the lateral mode sensor signals.

A meter electronics for a vibrating meter including a processing system is provided according to an embodiment. The processing system is configured to generate a drive mode drive signal to vibrate at least one fluid tube in a drive mode vibration and receive drive mode sensor signals based on a vibrational response to the drive mode vibration. According to an embodiment, the processing system is further configured to generate a lateral mode drive signal to vibrate the at least one fluid tube in a lateral mode vibration, wherein the lateral mode is approximately perpendicular to the drive mode. The processing system is further configured to receive lateral mode sensor signals based on a vibrational response to the lateral mode vibrations and determine a lateral mode stiffness based on the lateral mode sensor signals.

A vibrating meter including a sensor assembly and a meter electronics is provided according to an embodiment. The vibrating meter includes one or more fluid tubes and a first driver coupled to the one or more fluid tubes and oriented to induce a drive mode vibration in the one or more fluid tubes. One or more pick-offs are coupled to the one or more fluid tubes and oriented to sense a drive mode vibration in the one or more fluid tubes. According to an embodiment, a second driver is coupled to the one or more fluid tubes and oriented to induce a lateral mode vibration in the one or more fluid tubes. According to an embodiment, the vibrating meter further includes one or more pick-offs coupled to the one or more fluid tubes and oriented to sense a lateral mode vibration in the one or more fluid tubes.

ASPECTS

According to an aspect, a method for determining a lateral mode stiffness of one or more fluid tubes in a vibrating meter comprises steps of:

vibrating at least one of the one or more fluid tubes in a drive mode vibration;

receiving drive mode sensor signals based on a vibrational response to the drive mode vibration;

vibrating at least one of the one or more fluid tubes in a lateral mode vibration, wherein the lateral mode is approximately perpendicular to the drive mode;

receiving lateral mode sensor signals based on a vibrational response to the lateral mode vibrations; and determining a lateral mode stiffness based on the lateral mode sensor signals.

Preferably, the step of vibrating at least one of the one or more fluid tubes in the lateral mode vibration comprises vibrating the at least one fluid tube at more than one lateral mode frequency.

Preferably, the step of vibrating at least one of the one or more fluid tubes in the lateral mode vibration comprises vibrating two fluid tubes in a lateral mode vibration with respect to one another.

Preferably, the step of vibrating at least one of the one or more fluid tubes in the lateral mode vibration comprises vibrating a fluid tube in the lateral mode vibration with respect to a case.

Preferably, the step of determining the lateral mode stiffness is based on the lateral mode sensor signals and the drive mode sensor signals.

Preferably, the method further comprises a step of comparing the determined lateral mode stiffness to an expected lateral mode stiffness.

Preferably, the expected lateral mode stiffness is based on a measured density of a fluid within the one or more fluid tubes.

According to another aspect, a meter electronics for a vibrating meter including a processing system is configured to:

generate a drive mode drive signal to vibrate at least one fluid tube in a drive mode vibration;

receive drive mode sensor signals based on a vibrational response to the drive mode vibration;

generate a lateral mode drive signal to vibrate the at least one fluid tube in a lateral mode vibration, wherein the lateral mode is approximately perpendicular to the drive mode;

receive lateral mode sensor signals based on a vibrational response to the lateral mode vibrations; and determine a lateral mode stiffness based on the lateral mode sensor signals.

Preferably, the processing system is configured to generate more than one lateral mode drive signal at more than one lateral mode frequency.

Preferably, the processing system is configured to apply the generated lateral mode drive signal to two fluid tubes to vibrate the two fluid tubes in a lateral mode vibration with respect to one another.

Preferably, the processing system is configured to apply the generated lateral mode drive signal to a fluid tube to vibrate the fluid tube in a lateral mode vibration with respect to a case.

Preferably, the processing system is further configured to determine the lateral mode stiffness based on the lateral mode sensor signals and the drive mode sensor signals.

Preferably, the processing system is further configured to compare the determined lateral mode stiffness to an expected lateral mode stiffness.

Preferably, the expected lateral mode stiffness is based on a measured density of a fluid within the one or more fluid tubes.

According to another aspect, a vibrating meter including a sensor assembly and a meter electronics comprises:

one or more fluid tubes;

a first driver coupled to the one or more fluid tubes and oriented to induce a drive mode vibration in the one or more fluid tubes;

one or more pick-offs coupled to the one or more fluid tubes and oriented to sense a drive mode vibration in the one or more fluid tubes;

a second driver coupled to the one or more fluid tubes and oriented to induce a lateral mode vibration in the one or more fluid tubes; and one or more pick-offs coupled to the one or more fluid tubes and oriented to sense a lateral mode vibration in the one or more fluid tubes.

Preferably, a first portion of the second driver is coupled to a first fluid tube and a second portion of the second driver is coupled to a second fluid tube.

Preferably, a first portion of the one or more pick-offs oriented to sense a lateral mode vibration is coupled to the first fluid tube and a second portion is coupled to a second fluid tube.

Preferably, a first portion of the second driver is coupled to a first fluid tube and a second portion of the second driver is coupled to a case.

Preferably, a first portion of the one or more pick-offs oriented to sense a lateral mode vibration is coupled to the first fluid tube and a second portion is coupled to the case.

DETAILED DESCRIPTION OF THE INVENTION

FIGS. 1-5 and the following description depict specific examples to teach those skilled in the art how to make and use the best mode of embodiments of a vibrating meter. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the vibrating meter. As a result, the embodiments described below are not limited to the specific examples described below, but only by the claims and their equivalents.

Figure 1:
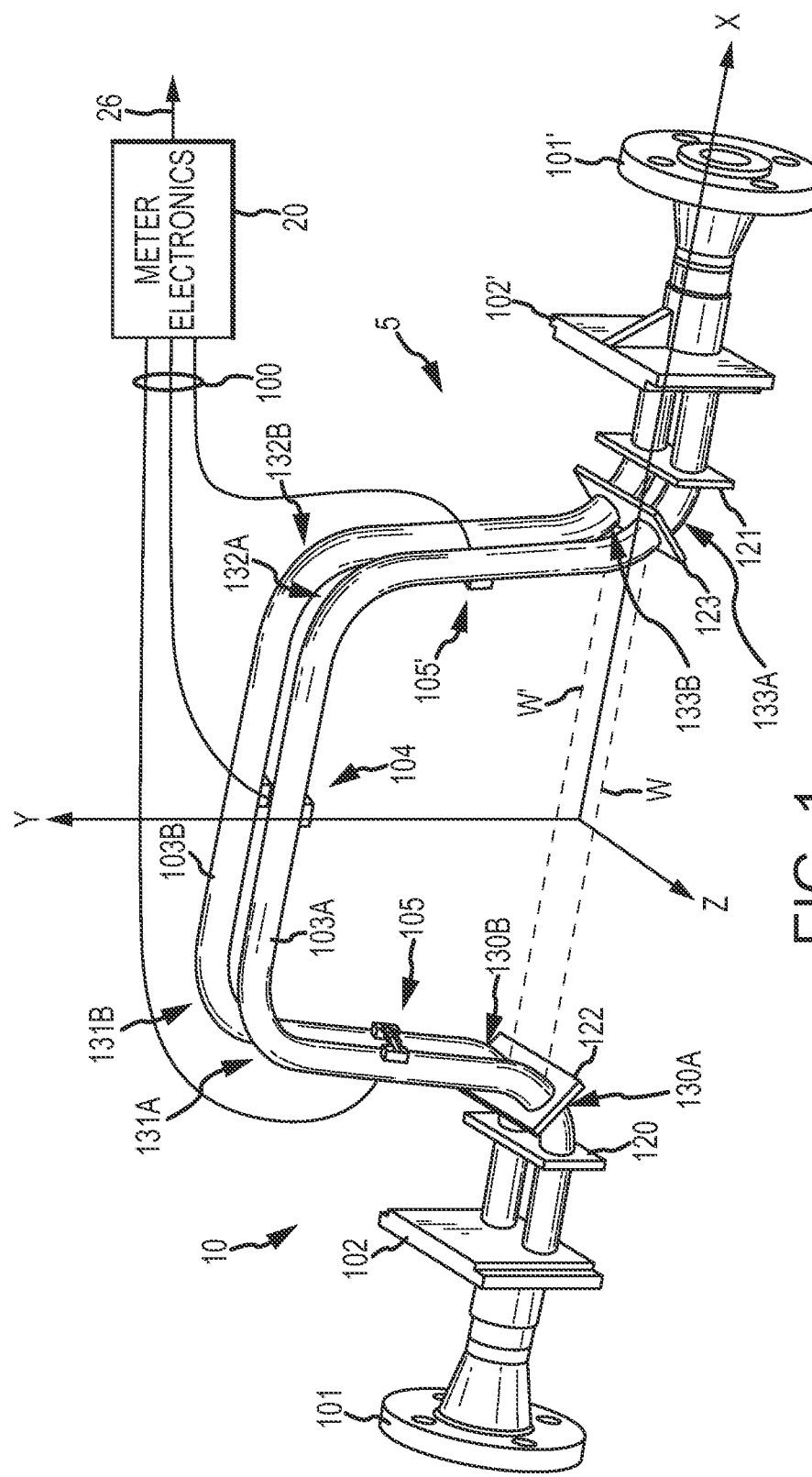
FIG. 1 shows a prior art vibrating meter.

FIG. 1 shows a prior art vibrating meter 5 in the form of a meter comprising a sensor assembly 10 and one or more meter electronics 20. The vibrating meter 5 may comprise a Coriolis flow meter, a vibrating volumetric flow meter, a vibrating densitometer, etc. The meter electronics 20 is connected to the sensor assembly 10 via leads 100 to measure a characteristic of a substance, such as, for example, a fluid density, a mass flow rate, a volume flow rate, a totalized mass flow, a temperature, and other information over path 26.

The sensor assembly 10 of the present example includes a pair of flanges 101, 101'; manifolds 102, 102'; a driver 104; pick-offs 105, 105'; and conduits 103A, 103B. The driver 104 and pick-offs 105, 105' are coupled to the fluid tubes 103A and 103B as is generally known in the art. In use, the flanges 101, 101' can be coupled to a pipeline (not shown) carrying a fluid.

It should be appreciated by those skilled in the art that it is within the scope of the present embodiment to use the principles discussed herein in conjunction with any type of vibrating meter, including vibrating meters that lack the measurement capabilities of a Coriolis flow meter. Examples of such devices include vibrating densitometers, volumetric flow meters, etc.

Flanges 101, 101' of the present example are coupled to the manifolds 102, 102'. The manifolds 102, 102' of the present example are affixed to opposite ends of the fluid tubes 103A, 103B. Brace bars 120-123 are further coupled to the fluid tubes 103A, 103B to define the bending axes W, W' of the fluid tubes 103A, 103B. When the sensor assembly 10 is inserted into a pipeline system (not shown) which carries the substance, the substance enters sensor assembly 10 through the flange 101, passes through the inlet manifold 102 where the total amount of material is directed to enter the tubes 103A, 103B, flows through the tubes 103A, 103B, and back into the outlet manifold 102' where it exits the sensor assembly 10 through the flange 101'.

As is generally known in the art, the driver 104 can vibrate the fluid tubes 103A, 103B in a drive mode in the z-direction, generally about the x-axis. Therefore, the drive mode vibrates the fluid tubes 103A, 103B in a direction generally perpendicular to the longitudinal axis of the fluid tubes. As the fluid tubes 103, 103B are vibrated about the x-axis, the flowing fluid induces Coriolis deflections in the two fluid tubes 103A, 103B, which is measured as a phase difference between the first and second pick-offs 105, 105'. The phase difference between the pick-offs 105, 105' is multiplied by the flow calibration factor to calculate a mass flow rate. As discussed above, changes in the cross-sectional areas of the fluid tubes 103A, 103B can affect the stiffness of the fluid tubes 103A, 103B, which can alter the flow calibration factor.

As mentioned above, changes in the cross-sectional area of the fluid tubes 103A, 103B typically occur first at the outer bends of the curved fluid tubes 103A, 103B. The outer bends are outlined as 130, 131, 132, and 133 with "A" and "B" designated for the first fluid tube 103A and the second fluid tubes 103B, respectively. Changes in these sections of the fluid tubes 103A, 103B generally do not affect the driving mode (bending) stiffness. Consequently, the drive mode vibrational frequency may not change when a change in the cross-sectional area begins in the fluid tubes 103A, 103B, for example, when erosion first begins in the fluid tubes 103A, 103B. Therefore, the fluid tubes 103A, 103B may erode or corrode to a dangerous level before the problem is detected. Consequently, there is need for earlier detection techniques.

Figure 2:
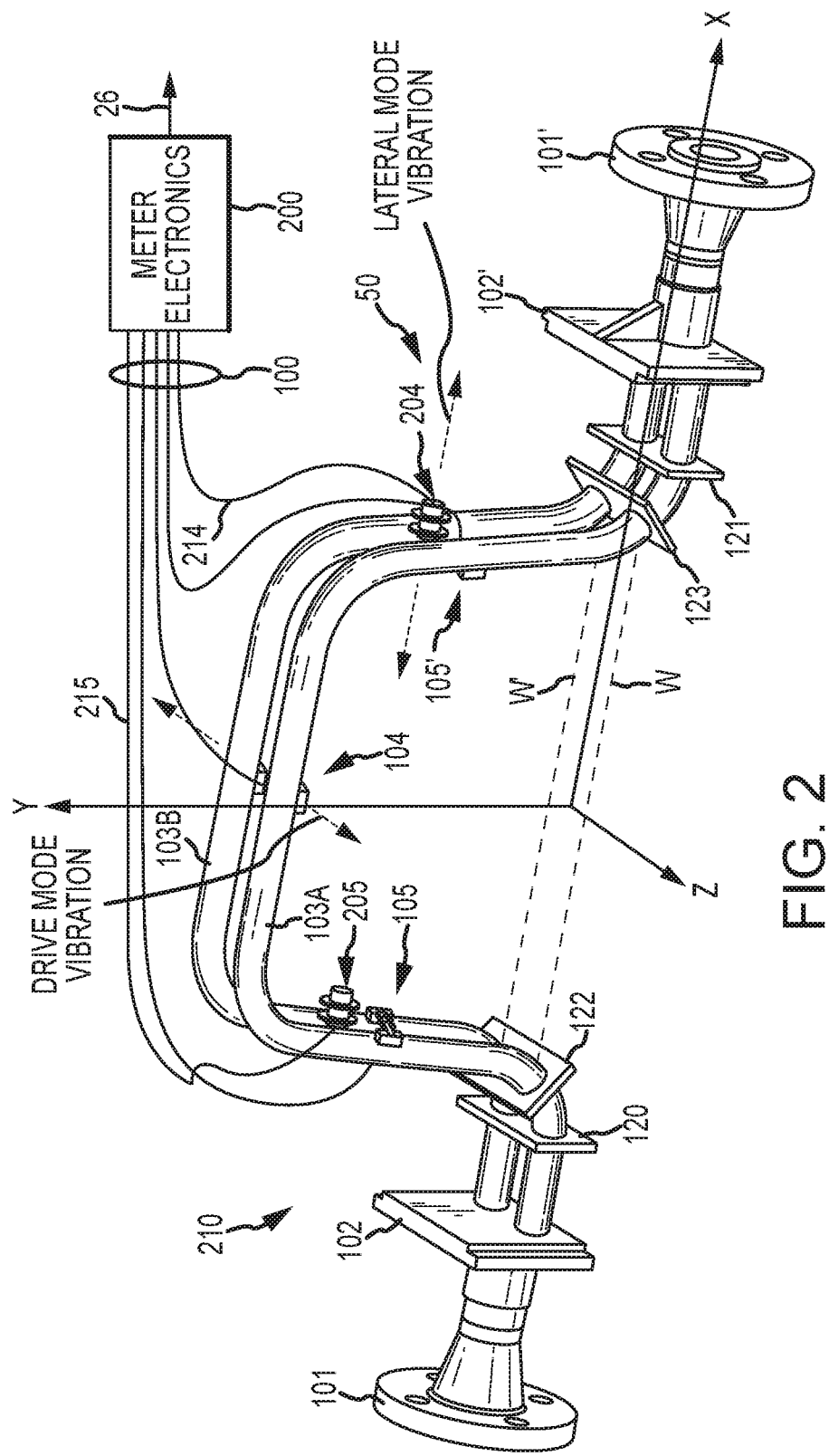
FIG. 2 shows a vibrating meter according to an embodiment.

FIG. 2 shows the vibrating meter 50 according to an embodiment. The vibrating meter 50 comprises a sensor assembly 210 and a meter electronics 200. The vibrating meter 50 is similar to the vibrating meter 5 shown in FIG. 1 and components that are the same as in FIG. 1 share the same reference number. In addition to the components of the vibrating meter 5, the vibrating meter 50 adds a second driver 204 and a third pick-off 205. The second driver 204 can be electrically coupled to the meter electronics 200 via a lead 214 while the third pick-off 205 is electrically coupled to the meter electronics 200 via lead 215.

It should be appreciated, that the pick-off 205 is described as comprising a third pick-off because two pick-offs 105, 105' are shown in FIG. 1. However, in embodiments where only one pick-off is used to sense the drive mode vibration, the pick-off 205 may comprise a second pick-off. This may be the case if the vibrating meter 50 comprises a vibrating densitometer, for example. Therefore, the particular number of pick-offs should in no way limit the scope of the present embodiment. As can be appreciated, the second driver 204 and the third pick-off 205 can comprise a similar coil/magnet combination used for the first driver 104 and the first and second pick-offs 105, 105'. However, rather than being oriented to drive and sense motion of the fluid tubes 103A, 103B about the x-axis, the second driver 204 is oriented to vibrate the fluid tubes 103A, 103B in a direction perpendicular to the drive motion and parallel to the fluid flow, i.e., about the z-axis and the third pick-off 205 is oriented to sense the motion of the fluid tubes 103A, 103B in the direction perpendicular to the drive motion. Therefore, according to an embodiment, the second driver 204 can induce a lateral mode vibrational frequency and the third pick-off 205 can sense a lateral mode vibrational frequency. As can be appreciated, while prior art vibrating meters were capable of determining a drive mode stiffness as discussed above, the driver 204 and pick-off 205 allow the meter electronics 20 of the present embodiment to determine a lateral mode stiffness of the fluid tubes 103A, 103B. In many situations, a change in the lateral mode stiffness can indicate a change in the fluid tube's cross-sectional area due to erosion, corrosion, or coating before a change in the drive mode stiffness would indicate such a change. Therefore, determining a lateral mode stiffness based on a vibrational response from the third pick-off 205 is advantageous in detecting problems with the sensor assembly over prior art methods that rely on detecting changes in the bending mode stiffness.

According to the embodiment shown in FIG. 2, the second driver 204 is positioned to vibrate the fluid tubes 103A, 103B in the lateral mode with respect to one another. In other words, one part of the driver 204 is coupled to the first fluid tube 103A while a second part of the driver 204 is coupled to the second fluid tube 103B. As an example, if the second driver 204 comprises the traditional coil/magnet combination, the coil can be coupled to the first fluid tube 103A and the magnet can be coupled to the second fluid tube 103B. Therefore, the fluid tubes 103A, 103B will be vibrated in a scissor like movement. Likewise, a first part of the pick-off 205 is coupled to the first fluid tube 103A, while a second part of the pick-off 205 is coupled to the second fluid tube 103B. Using the example for the driver 204, a coil of the pick-off 205 can be coupled to the first fluid tube 103A and the magnet can be coupled to the second fluid tube 103B. Therefore, the third pick-off 205 is oriented to sense a lateral mode vibration excited by the second driver 204.

Figure 3:
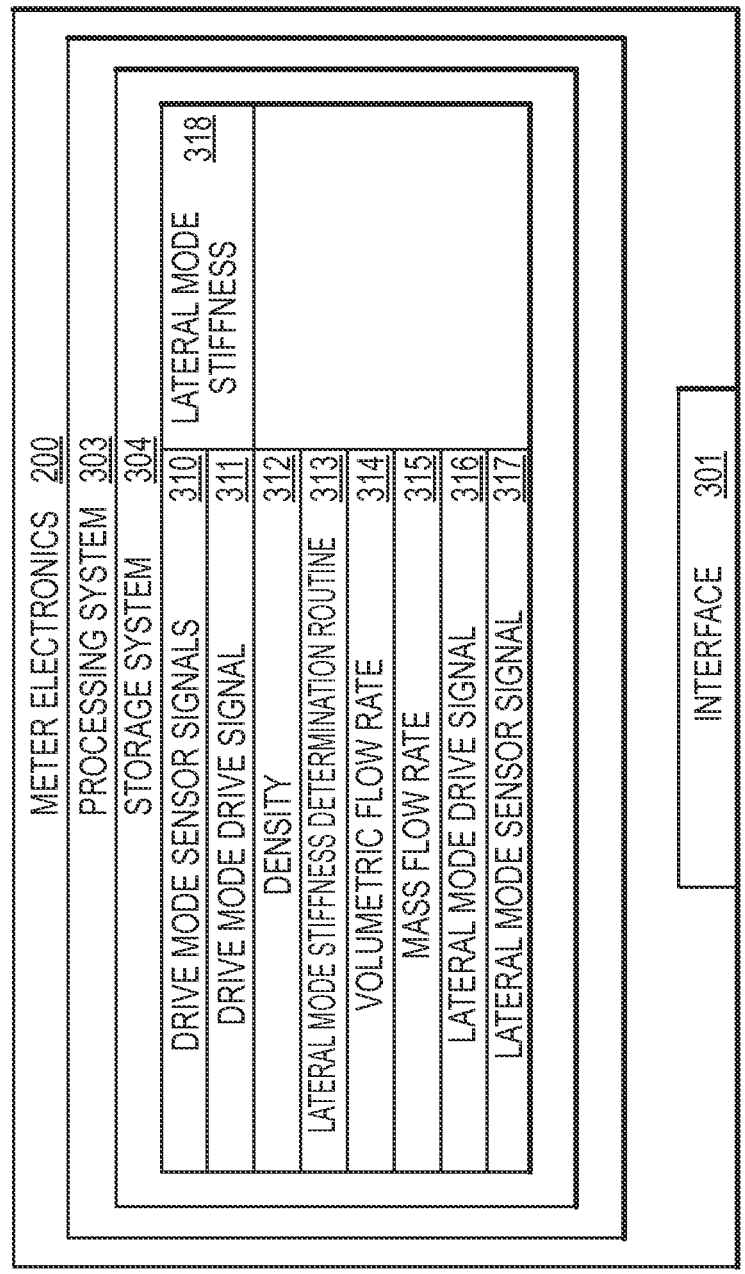
FIG. 3 shows a meter electronics according to an embodiment.

FIG. 3 shows the meter electronics 200 according to an embodiment of the invention. The meter electronics 200 can include an interface 301 and a processing system 303. The processing system 303 may include a storage system 304. The storage system 304 may comprise an internal memory as shown, or alternatively, may comprise an external memory. The processing system 303 of the meter electronics 200 can generate a drive mode drive signal 311 and supply the drive mode drive signal 311 to the first driver 104 of the sensor assembly 210. The processing system 303 of the meter electronics 200 can also receive a vibrational response in the form of drive mode sensor signals 310 from the sensor assembly 210. More specifically, the drive mode sensor signals 310 can be received from the first and second pick-offs 105, 105'. The processing system 303 of the meter electronics 200 can process the drive mode sensor signals 310 in order to obtain a density 311, a volume flow rate 314, and a mass flow rate 315 of the material flowing through the conduit 201. As those skilled in the art will readily appreciate, the drive mode sensor signals 310 may be utilized to determine other fluid characteristics and the particular examples provided should in no way limit the scope of the present embodiment.

According to an embodiment, the meter electronics 200 can also generate a lateral mode drive signal 316 and supply the lateral mode drive signal 316 to the second driver 204. The meter electronics 200 can receive a second vibrational response in the form of lateral mode sensor signals 317 from the third pick-off sensor 205. The processing system 303 of the meter electronics can process the lateral mode sensor signals 317 to determine a lateral mode stiffness 318 of the fluid tubes 103A, 103B. The processing system 303 of the meter electronics 200 can determine the lateral mode stiffness 318 using one of the equations provided above or using some other well-known technique. It should be appreciated that the meter electronics 200 may determine the lateral mode stiffness 318 in a manner substantially similar to how the bending mode stiffness is typically determined during the initial calibration routine. However, rather than using the resonant drive frequency, which is used during the initial calibration routine, one or more lateral mode vibrational frequencies can be used instead.

As can be appreciated, the interface 301 may perform any necessary or desired signal conditioning, such as any manner of formatting, amplification, buffering, etc. Alternatively, some or all of the signal conditioning can be performed in the processing system 303. In addition, the interface 301 can enable communications between the meter electronics 200 and a remote processing system (not shown). The interface 301 can be capable of any manner of electronic, optical, or wireless communication.

The interface 301 in one embodiment can include a digitizer (not shown); wherein the sensor signals 310, 317 comprise analog sensor signals. The digitizer can sample and digitize the analog sensor signals and produce digital sensor signals. The digitizer can also perform any needed decimation, wherein the digital sensor signal is decimated in order to reduce the amount of signal processing needed and to reduce the processing time.

The processing system 303 can conduct operations of the meter electronics 200. The processing system 303 can execute the data processing required to implement one or more processing routines, such as the lateral mode stiffness determination routine 313. The lateral mode stiffness determination routine 313 can use any of the equations listed above along with the generated density 312 and mass flow rate 315 to generate the lateral mode stiffness 318. As can be appreciated, the resonant frequency of the lateral mode drive signal 316 will depend upon the mass of the system, which is dependent upon the density/mass of the fluid within the fluid tubes 103A, 103B. Consequently, in order to accurately determine the lateral mode stiffness, the mass of the system may be required. In some embodiments, the determined lateral mode stiffness 318 may be compared to an expected lateral mode stiffness. The expected lateral mode stiffness may be based on a measured density 312 of the fluid within the fluid tubes 103A, 103B. During an initial calibration, a table, graph, etc. can be generated with various lateral mode resonant frequencies taken at various fluid densities. Therefore, changes in a resonant frequency of the lateral mode drive signal 316 can be compensated for changes in the density of the fluid rather than being attributed to a change in the lateral mode stiffness 318.

It should be understood that the meter electronics 220 may include various other components and functions that are generally known in the art. These additional features are omitted from the description and the figures for the purpose of brevity. Therefore, the present invention should not be limited to the specific embodiments shown and discussed.

Figure 4:
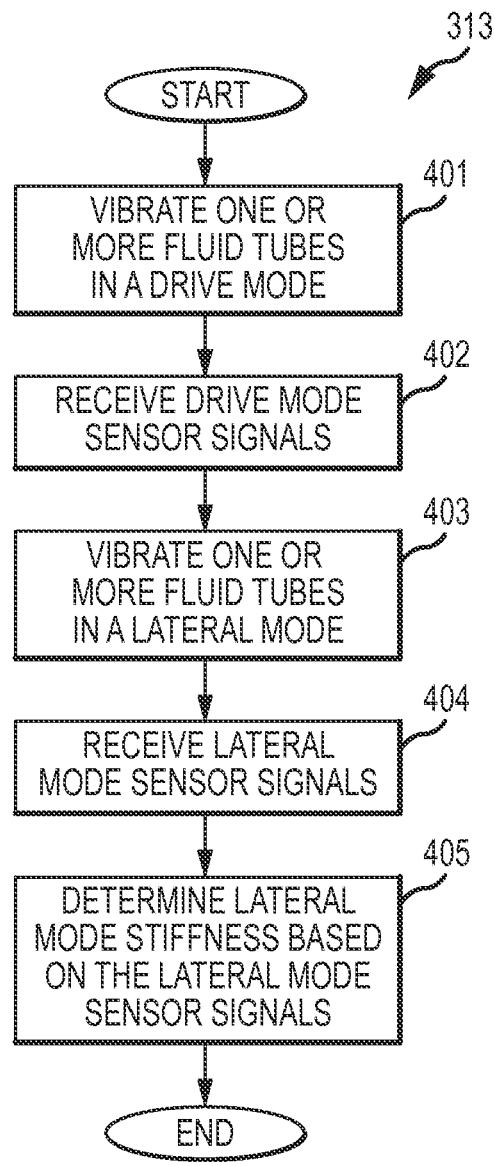
FIG. 4 shows a lateral mode stiffness determination routine according to an embodiment.

FIG. 4 shows a lateral mode stiffness determination routine 313 according to an embodiment. According to an embodiment, the lateral mode stiffness determination routine 313 can be performed by the meter electronics 200, for example. According to an embodiment, the lateral mode stiffness determination routine 313 may be performed during normal operation of the vibrating meter 50. Although the lateral mode stiffness determination routine 313 may be performed substantially continuously, in other embodiments, the routine 313 may be performed at regular intervals, or when a user initiates the routine 313. It should be appreciated that unlike prior art methods for determining a change in the cross-sectional properties of the vibrating meter's tubes 103A, 103B that interfere with normal operation, the lateral mode stiffness determination routine 313 can be performed while normal measurements are being taken.

According to an embodiment, the lateral mode stiffness determination routine 313 begins in step 401 where the one or more fluid tubes 103A, 103B are vibrated in a drive mode. According to an embodiment, the one or more fluid tubes 103A, 103B can be vibrated in the drive mode using the first driver 104, for example.

According to an embodiment, the lateral mode stiffness determination routine 313 can proceed to step 402 where drive mode sensor signals 311 are received. As explained above, the drive mode sensor signals 311 can be received from the first and second pick-off sensors 105, 105', for example. As can be appreciated, steps 401 and 402 are not unique to the present embodiment, and these steps are taken during normal operation of vibrating meters.

However, in step 403, the one or more fluid tubes 103A, 103B are vibrated in a lateral mode. According to an embodiment, the one or more fluid tubes 103A, 103B can be vibrated in the lateral mode using the second driver 204, for example. According to one embodiment, step 403 may be performed after step 401. In an alternative embodiment, step 403 may be performed substantially simultaneously with step 401. Therefore, the one or more fluid tubes 103A, 103B can be vibrated in the drive mode and the lateral mode substantially simultaneously. The one or more fluid tubes 103A, 103B may be vibrated at one or more lateral mode vibrational frequencies. Therefore, the present embodiment should not be limited to a single lateral mode vibrational frequency.

According to an embodiment, in step 404, lateral mode sensor signals 317 can be received. The lateral mode sensor signals 317 can be received from the third pick-off sensor 205, which as explained above is oriented to sense a lateral mode vibration of the one or more fluid tubes 103A, 103B.

The lateral mode stiffness determination routine 313 can proceed to step 405 where a lateral mode stiffness is determined based on the lateral mode sensor signals. As discussed above, for a more accurate measurement, the mass of the system, i.e., a fluid density measurement is required to determine a lateral mode stiffness. Therefore, the drive mode sensor signals 311 are generally required to accurately determine the mass of the system. Consequently, in some embodiments, the lateral mode stiffness is determined based on the drive mode sensor signals 310 and the lateral mode sensor signals 317. Without the drive mode sensor signals 310, a density of the fluid within the one or more fluid tubes 103A, 103B needs to be assumed or alternatively, the lateral mode drive signal 316 can be vibrated at more than one frequency. Vibrating at more than one frequency can allow the mass, stiffness, and damping to be determined as explained in greater detail in the '995 patent mentioned above.

In some embodiments, upon determining a lateral mode stiffness of the one or more fluid tubes 103A, 103B, the determined lateral mode stiffness can be compared to an expected lateral mode stiffness. The expected lateral mode stiffness may be based on a previously determined value, for example. The previously determined value may be obtained from the previously generated graph or table as mentioned above. According to an embodiment, if a difference between the determined lateral mode stiffness and the expected lateral mode stiffness exceeds a threshold amount, a user or operator may be alerted that a problem exists.

According to another embodiment, the lateral mode stiffness can be compared to a stiffness determined previously using the lateral mode stiffness determination routine 313. For example, if the lateral mode stiffness changes by a threshold amount between operations of the routine 313, a user or operator may be alerted that a problem exists. The problem may be caused by erosion, corrosion, or coating, for example.

As can be appreciated, the lateral mode stiffness determination routine 313 is advantageous compared to previous methods for determining a change in a cross-sectional area of the one or more fluid tubes 103A, 103B because the routine 313 can be run substantially simultaneously to normal operation of the vibrating meter 50. Further, the routine 313 can detect problems earlier than previous approaches because the lateral mode stiffness may be affected prior to or more than the bending mode stiffness. Therefore, users and operators can be alerted of problems earlier than in the prior art.

Figure 5:
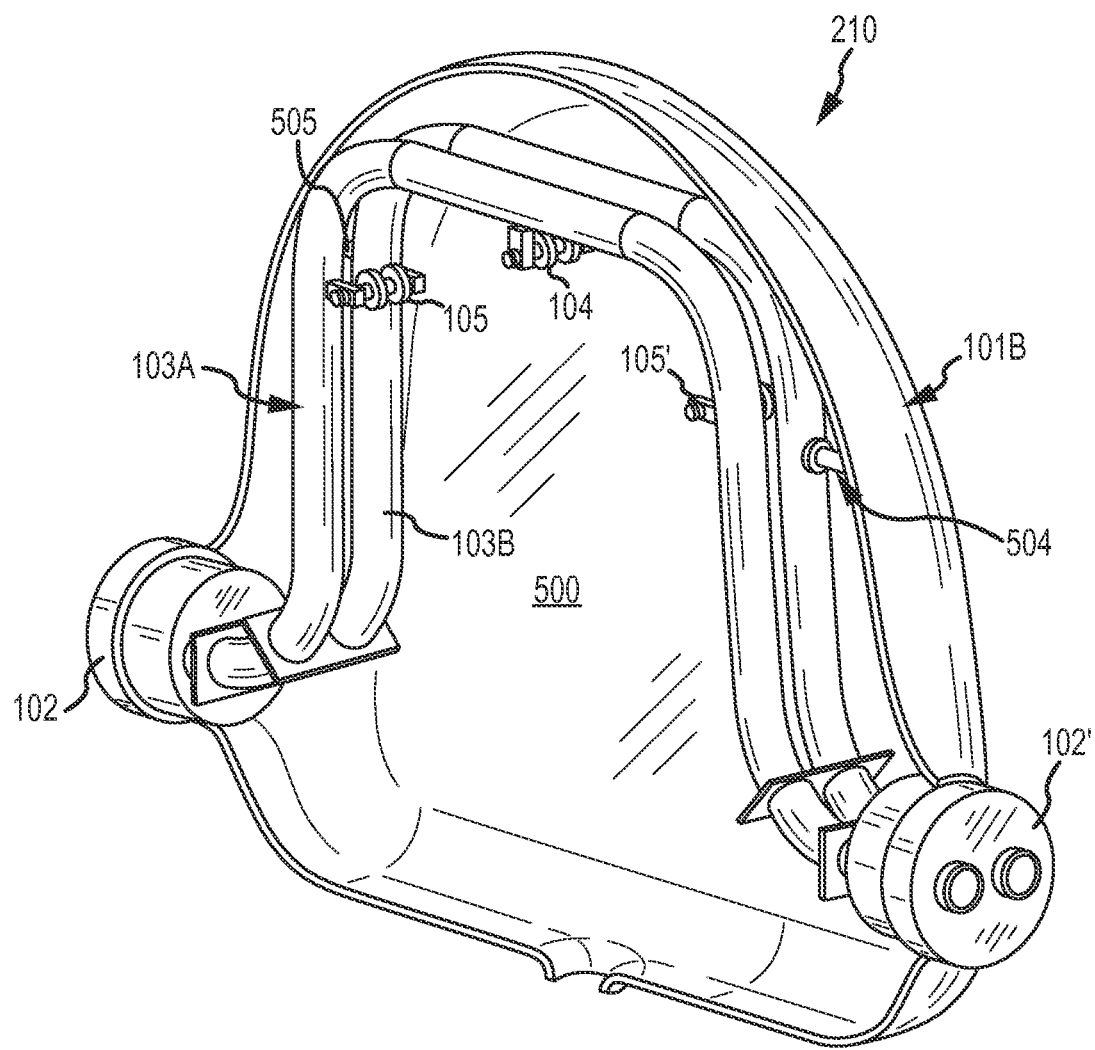
FIG. 5 shows the vibrating meter according to another embodiment.

FIG. 5 shows the vibrating meter 50 according to another embodiment. The vibrating meter 50 shown in FIG. 5 is similar to the vibrating meter 50 shown in FIG. 2. However, in FIG. 5, a case 500 is provided. Only a portion of the case 500 is shown so that the interior of the case 500 can be seen. A further difference between the embodiment shown in FIG. 2 and the embodiment shown in FIG. 5 is that in FIG. 5, only one fluid tube 103B is vibrated in the lateral mode. Therefore, a first portion of the second driver 504 is coupled to the fluid tube 103B and a second portion of the second driver 504 is coupled to the case 500. Therefore, the fluid tube 103B is vibrated in the lateral mode with respect to the case 500 rather than with respect to the other fluid tube 103A. Further, the third pick-off 505 comprises a first portion coupled to the fluid tube 103B and a second portion coupled to the case 500. This type of configuration may be used in dual tube vibrating meters; however, the configuration is also useful in single tube vibrating meters. Therefore, by vibrating the fluid tube 103B in the lateral mode with respect to the case 500, it can be seen that the lateral mode stiffness determination routine 313 can be used for single tube vibrating meters.

The embodiments described above provide an improved system for determining a lateral mode stiffness. As explained above, the embodiments can detect a possible problem in the vibrating meter that may be caused from erosion, corrosion, or coating that affects the lateral mode stiffness. Therefore, because these changes in the cross-sectional area of the fluid tubes generally affect the lateral mode stiffness earlier than the bending mode stiffness, the embodiments can be used to alert a user of a problem with the vibrating meter earlier than in the prior art.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other vibrating meters, and not just to the embodiments described above and shown in the accompanying figures. Accordingly, the scope of the embodiments described above should be determined from the following claims.

We claim:

1. A method for determining a lateral mode stiffness of one or more fluid tubes in a vibrating meter, comprising steps of:
    vibrating at least one of the one or more fluid tubes in a drive mode vibration, with a first driver;
    receiving drive mode sensor signals based on a vibrational response to the drive mode vibration with a first pick-off;
    vibrating at least one of the one or more fluid tubes in a lateral mode vibration, wherein the lateral mode is substantially perpendicular to the drive mode with a second driver;
    receiving lateral mode sensor signals based on a vibrational response to the lateral mode vibrations with a second pickoff; and
    determining a lateral mode stiffness based on the lateral mode sensor signals;
    wherein the first driver is oriented substantially perpendicularly to the second driver, and the first pickoff is oriented substantially perpendicularly to the second pickoff.

2. The method of claim 1, wherein the step of vibrating at least one of the one or more fluid tubes in the lateral mode vibration comprises vibrating the at least one fluid tube at more than one lateral mode frequency.

3. The method of claim 1, wherein the step of vibrating at least one of the one or more fluid tubes in the lateral mode vibration comprises vibrating two fluid tubes in a lateral mode vibration with respect to one another.

4. The method of claim 1, wherein the step of vibrating at least one of the one or more fluid tubes in the lateral mode vibration comprises vibrating a fluid tube in the lateral mode vibration with respect to a case.

5. The method of claim 1, wherein the step of determining the lateral mode stiffness is based on the lateral mode sensor signals and the drive mode sensor signals.

6. The method of claim 1, further comprising a step of comparing the determined lateral mode stiffness to an expected lateral mode stiffness.

7. The method of claim 6, wherein the expected lateral mode stiffness is based on a measured density of a fluid within the one or more fluid tubes.

8. A meter electronics (200) for a vibrating meter (5) including a processing system (303) configured to:
   generate a drive mode drive signal (311) to vibrate at least one fluid tube (103A, 103B) with a first driver in a drive mode vibration;
   receive drive mode sensor signals (310) from a first pickoff based on a vibrational response to the drive mode vibration;
   generate a lateral mode drive signal (316) to vibrate the at least one fluid tube (103A, 103B) with a second driver in a lateral mode vibration, wherein the lateral mode is substantially perpendicular to the drive mode;
   receive lateral mode sensor signals (317) from a second pickoff based on a vibrational response to the lateral mode vibrations; and
   determine a lateral mode stiffness (318) based on the lateral mode sensor signals (317);
   wherein the first driver is oriented substantially perpendicularly to the second driver, and the first pickoff is oriented substantially perpendicularly to the second pickoff.

9. The meter electronics (200) of claim 8, wherein the processing system (303) is configured to generate more than one lateral mode drive signal (316) at more than one lateral mode frequency.

10. The meter electronics (200) of claim 8, wherein the processing system (303) is configured to apply the generated lateral mode drive signal (316) to two fluid tubes (103A, 103B) to vibrate the two fluid tubes (103A, 103B) in a lateral mode vibration with respect to one another.

11. The meter electronics (200) of claim 8, wherein the processing system (303) is configured to apply the generated lateral mode drive signal (316) to a fluid tube (103A, 103B) to vibrate the fluid tube (103A, 103B) in a lateral mode vibration with respect to a case (500).

12. The meter electronics (200) of claim 8, wherein the processing system (303) is further configured to determine the lateral mode stiffness based on the lateral mode sensor signals (317) and the drive mode sensor signals (310).

13. The meter electronics (200) of claim 8, wherein the processing system (303) is further configured to compare the determined lateral mode stiffness to an expected lateral mode stiffness.

14. The meter electronics (200) of claim 13, wherein the expected lateral mode stiffness is based on a measured density of a fluid within the one or more fluid tubes.

15. A vibrating meter (5) including a sensor assembly (210) and a meter electronics (200), comprising:
   one or more fluid tubes (103A, 103B);
   a first driver (104) coupled to the one or more fluid tubes (103A, 103B) and oriented to induce a drive mode vibration in the one or more fluid tubes (103A, 103B);
   one or more pick-offs (105, 105') coupled to the one or more fluid tubes (103A, 103B) and oriented to sense a drive mode vibration in the one or more fluid tubes (103A, 103B);
   a second driver (204) coupled to the one or more fluid tubes (103A, 103B) and oriented to induce a lateral mode vibration in the one or more fluid tubes (103A, 103B); and
   a pick-off (205) coupled to the one or more fluid tubes (103A, 103B) and oriented to sense a lateral mode vibration in the one or more fluid tubes (103A, 103B),
   wherein the first driver is oriented substantially perpendicularly to the second driver, and the first pickoff is oriented substantially perpendicularly to the second pickoff.

16. The vibrating meter (5) of claim 15, wherein a first portion of the second driver (204) is coupled to a first fluid tube (103A) and a second portion of the second driver (204) is coupled to a second fluid tube (103B).

17. The vibrating meter (5) of claim 16, wherein a first portion of the pick-off (205) oriented to sense a lateral mode vibration is coupled to the first fluid tube (103A) and a second portion is coupled to a second fluid tube (103B).

18. The vibrating meter (5) of claim 15, wherein a first portion of the second driver (205) is coupled to a first fluid tube (103A) and a second portion of the second driver (205) is coupled to a case (500).

19. The vibrating meter (5) of claim 18, wherein a first portion of the pick-off (205) oriented to sense a lateral mode vibration is coupled to the first fluid tube (103A) and a second portion is coupled to the case (500).

* * * * *

UNITED STATES PATENT AND TRADEMARK OFFICE
CERTIFICATE OF CORRECTION

| | | |
|---|---|---|
| PATENT NO. | : 9,671,268 B2 | Page 1 of 1 |
| APPLICATION NO. | : 14/440531 | |
| DATED | : June 6, 2017 | |
| INVENTOR(S) | : Goldino Alves and Mark James Bell | |

It is certified that error appears in the above-identified patent and that said Letters Patent is hereby corrected as shown below:

In the Specification

Column 7, Line 46 replace "103" with --103A--

Signed and Sealed this
Eighth Day of May, 2018

Andrei Iancu
*Director of the United States Patent and Trademark Office*